(12) United States Patent
Basso et al.

(10) Patent No.: US 8,391,305 B2
(45) Date of Patent: *Mar. 5, 2013

(54) ASSIGNMENT CONSTRAINT MATRIX FOR ASSIGNING WORK FROM MULTIPLE SOURCES TO MULTIPLE SINKS

(75) Inventors: Claude Basso, Raleigh, NC (US); Jean L. Calvignac, Raleigh, NC (US); Chih-Jen Chang, Apex, NC (US); Hubertus Franke, Cortlandt Manor, NY (US); Fabrice J. Verplanken, LaGaude (FR); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 460 days.

This patent is subject to a terminal disclaimer.

(21) Appl. No.: 12/650,080

(22) Filed: Dec. 30, 2009

(65) Prior Publication Data

US 2011/0158249 A1 Jun. 30, 2011

(51) Int. Cl.
*H04L 12/28* (2006.01)
(52) U.S. Cl. .......................... 370/412; 370/229; 709/250
(58) Field of Classification Search .................. 370/412, 370/229; 709/250
See application file for complete search history.

(56) References Cited

U.S. PATENT DOCUMENTS

| 5,850,399 | A | 12/1998 | Ganmukhi et al. |
| 6,282,583 | B1 | 8/2001 | Pincus et al. |
| 6,549,930 | B1 | 4/2003 | Chrysos et al. |
| 6,606,326 | B1 | 8/2003 | Herring |
| 6,836,808 | B2 | 12/2004 | Bunce et al. |
| 7,248,585 | B2 | 7/2007 | Kohn et al. |
| 7,290,105 | B1 * | 10/2007 | Jeter et al. ..................... 711/163 |
| 7,304,944 | B2 | 12/2007 | Bitar et al. |
| 7,334,086 | B2 | 2/2008 | Hass et al. |
| 7,415,540 | B2 * | 8/2008 | Fallon et al. ................... 709/250 |
| 7,461,213 | B2 | 12/2008 | Hass et al. |
| 7,483,377 | B2 | 1/2009 | Szumilas |
| 7,508,764 | B2 | 3/2009 | Back et al. |
| 7,526,593 | B2 | 4/2009 | Mandal et al. |
| 7,646,779 | B2 | 1/2010 | Kumar et al. |
| 8,060,857 | B2 * | 11/2011 | Biggerstaff ..................... 717/106 |
| 8,108,844 | B2 | 1/2012 | Crutchfield et al. |
| 8,295,305 | B2 | 10/2012 | Basso et al. |
| 2005/0047425 | A1 | 3/2005 | Liu et al. |

(Continued)

OTHER PUBLICATIONS

"Adding Non-Realtime Scheduler Function to any Realtime Operating System," International Business Machines Corporation, Technical Disclosure, IP.com, Mar. 15, 2002, 3 pages.

(Continued)

*Primary Examiner* — Dang Ton
*Assistant Examiner* — Wei Zhao
(74) *Attorney, Agent, or Firm* — Yee & Associates, P.C.; Daniel H. Schnurmann

(57) ABSTRACT

An assignment constraint matrix is used in assigning work, such as data packets, from a plurality of sources, such as data queues in a network processing device, to a plurality of sinks, such as processor threads in the network processing device. The assignment constraint matrix is implemented as a plurality of qualifier matrixes adapted to operate simultaneously in parallel. Each of the plurality of qualifier matrixes is adapted to determine sources in a subset of supported sources that are qualified to provide work to a set of sinks based on assignment constraints. The determination of qualified sources may be based sink availability information that may be provided for a set of sinks on a single chip or distributed on multiple chips.

14 Claims, 7 Drawing Sheets

U.S. PATENT DOCUMENTS

| | | | |
|---|---|---|---|
| 2005/0243853 | A1 | 11/2005 | Bitar et al. |
| 2006/0140201 | A1 | 6/2006 | Kumar et al. |
| 2007/0294512 | A1* | 12/2007 | Crutchfield et al. .......... 712/200 |
| 2001/0158254 | | 6/2011 | Basso et al. |
| 2011/0158250 | A1* | 6/2011 | Basso et al. .................. 370/412 |

OTHER PUBLICATIONS

Krishna et al., "On the Speedup Required for Work-Conserving Crossbar Switches," IEEE Journal on Selected Areas in Communications, 17(6): 1057-1066, Jun. 1999.

Lopez-Benitez et al., "Real-Time HSPA Emulator for End-to-Edge QoS Evaluation in All-IP Beyond 3G Heterogeneous Wireless Networks," ACM, QoSim 2008, Marseille, France, pp. 1-12, Mar. 2008.

Luo et al., "Conserving Network Processor Power Consumption by Exploiting Traffic Variability," ACM Transactions on Architecture and Code Optimization, 4(1)4:1-26. Mar. 2007.

Paulin et al., "Application of a Multi-processor SoC Platform to High-Speed Packet Forwarding," Proceedings of the Design, Automation and Test in Europe, Conference and Exhibition Designers' Forum (DATE'04), pp. 1530-1591, Feb. 2004.

Ungerer et al., "A Survey of Processors with Explicit Multithreading," ACM Computing Surveys, 35(1):29-63, Mar. 2003.

Office Action, dated Feb. 16, 2012, regarding U.S. Appl. No. 12/650,174, 18 pages.

U.S. Appl. No. 12/650,120, filed Dec. 30, 2009, Basso et al.

U.S. Appl. No. 12/650,174, filed Dec. 30, 2009, Basso et al.

Notice of Allowance regarding U.S. Appl. No. 12/650,174, dated Jun. 15, 2012, 16 pages.

Office Action regarding U.S. Appl. No. 12/650,120 dated May 29, 2012, 19 pages.

\* cited by examiner

ASSIGNMENT CONSTRAINT MATRIX FOR ASSIGNING WORK FROM MULTIPLE SOURCES TO MULTIPLE SINKS

The present application is related to U.S. patent application Ser. No. 12/650,120 entitled "Assigning Work from Multiple Sources to Multiple Sinks"; and U.S. patent application Ser. No. 12/650,174 entitled "Dual Scheduling of Work from Multiple Sources to Multiple Sinks Using Source and Sink Attributes to Achieve Fairness and Processing Efficiency" filed on even date herewith and assigned to the assignee of the present application, the details of which are incorporated herein by reference.

BACKGROUND

1. Field

The disclosure relates generally to systems for processing data from multiple sources by multiple processors, such as network processing devices, and more specifically to systems and methods for assigning work in the form of data packets from multiple data queue sources to multiple processing thread sinks given constraints on which sinks may process work from which sources.

2. Description of the Related Art

Network processing devices, such as routers, switches and intelligent network adapters, are comprised of a network component, which receives incoming data traffic, and a finite set of processing elements, that are employed to process the incoming data. Network processing devices routinely partition incoming traffic into different segments for the purpose of providing network segment specific quality of service (QoS). Examples of quality of service parameters are bandwidth limitation enforcement on one particular segment or bandwidth weighting and/or prioritization across all segments. It is commonplace to associate a queue with each segment into which incoming data is divided. Incoming data packets are placed into the queue of their associated segment as they are received.

A queue scheduler is used to determine an order in which the queues are to be served by the device processing elements. For example, the queue scheduler may determine the next queue that is to be served. The next in line data packet, or other work item, from the selected queue is then placed into a single service queue. The processing elements retrieve data packets from the single service queue to provide the required processing for the retrieved data packet. It is commonplace to use polling or other interrupts to notify one or more of the processing elements when data packets are available for retrieval from the single service queue for processing.

Increasingly, the processing elements are comprised of multiple compute cores or processing units. Each core may be comprised of multiple hardware threads sharing the resources of the core. Each thread may be independently capable of processing incoming data packets. Using a conventional queue scheduler, only one thread at a time can get data from the single service queue.

Network processing system software increasingly desires to constrain which threads can service which queues in order to create locality of work. A conventional queue scheduler polls the status of all queues to determine the next best suited queue to process without reference to such constraints.

As the number of data queues increases, the time required in order to make a scheduling decision, also known as the scheduling period, also increases. For example, a device that is to support 100 Gbps network traffic comprised of small 64 byte packets needs to support a throughput of roughly 200 million packets per second. On a 2 GHz system, this implies that a scheduling decision needs to be accomplished in less than 10 clock cycles. In conventional queue schedulers, queues are attached to a queue inspection set, often referred to as a ring, when queue status is changed from empty to not-empty. Similarly, queues are detached from the queue inspection set when queue status is changed from not-empty to empty. Use of a queue inspection set limits the number of queues that need to be examined by the queue scheduler during a scheduling period, since the queue scheduler need only examine queues having data to be processed, and these are the not-empty queues attached to the queue inspection set.

SUMMARY

An assignment constraint matrix method and apparatus for use in assigning work from a plurality of sources to a plurality of sinks is disclosed. In an illustrative embodiment, the plurality of sources are data queues, such as data queues in a network processing device, the work is data packets on the data queues and awaiting processing, and the sinks are processing threads, such as threads on a plurality of processor cores of the networking processing device. The sinks may be implemented on one or more chips.

In an illustrative embodiment, an assignment constraint matrix is implemented by a plurality of qualifier matrixes. Each of the plurality of qualifier matrixes is adapted to determine sources in a subset of supported sources that are associated by assignment constraints to a set of sinks and thus are qualified to provide work to the set of sinks. The plurality of qualifier matrixes are adapted to operate simultaneously in parallel.

In an illustrative embodiment, a method for determining sources qualified to provide work to a set of sinks includes providing sink availability information for the set of sinks to a plurality of qualifier matrixes. Operating in parallel, each of the plurality of qualifier matrixes determines sources in a subset of supported sources that are qualified to provide work to the set of sinks.

In an illustrative embodiment, each of a plurality of qualifier matrixes is adapted to determine sources in a subset of supported sources that are qualified to provide work to a set of sinks from sink availability information. The plurality of qualifier matrixes are adapted to operate simultaneously in parallel. Sink availability information for sinks on one or more chips may be provided via multiplexers to each of the plurality of qualifier matrixes. The multiplexers may be controlled such that sink availability information is provided to the plurality of qualifier matrixes for a set of sinks on a single chip or such that sink availability information is provided to the plurality of qualifier matrixes for a set of sinks distributed on a plurality of chips.

Further objects, features, and advantages will be apparent from the following detailed description and with reference to the accompanying drawings.

DETAILED DESCRIPTION

Figure 1:
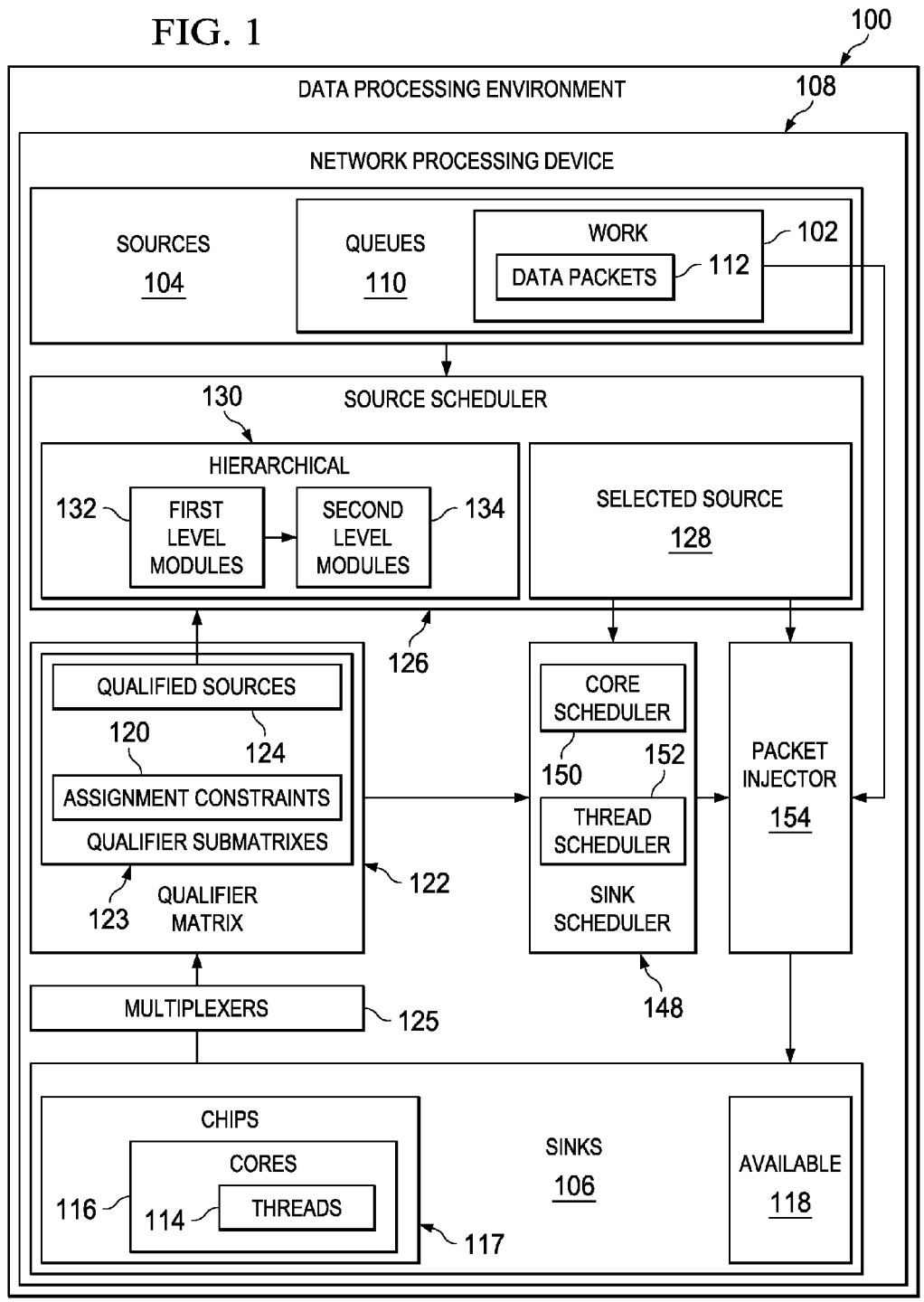
FIG. 1 is a functional block diagram of a system incorporating an apparatus and method for assigning work from multiple sources to multiple sinks in accordance with an illustrative embodiment.

A method and apparatus for matching work from multiple sources to multiple sinks subject to a set of assignment constraints is disclosed. Illustrative embodiments will be described in detail herein with reference to the example of application in network processing devices in which the multiple sources are multiple data queues, the multiple sinks are multiple threads, and the work is in the form of data packets that are to be assigned from the data queues to the threads for processing. It should be understood that other embodiments may be implemented in other applications for matching types of work that are different from those described by example herein from a plurality of sources that are different from those described by example herein to a plurality of sinks that are different from those described by example herein.

The different illustrative embodiments recognize and take into account a number of different considerations. For example, the different illustrative embodiments recognize and take into account that, as the number of cores and threads in network processing devices increases, the assignment of work, in the form of data packets, to threads for processing via a single service queue, as employed in conventional queue scheduling, becomes problematic. The scalability of conventional methods for assigning data packets to cores is limited due to contention on the single service queue.

Furthermore, the different illustrative embodiments recognize and take into account that conventional queue scheduling is not adapted to respond effectively to constraints on which threads can service which queues. Such constraints can cause problems that unnecessarily limit system performance in systems where conventional queue scheduling is employed. A conventional queue scheduler polls the status of all queues to determine the next best suited queue to process without reference to such constraints. A constraint imposed by a thread to queue assignment may prevent data from the selected queue from being dispatched to a thread for processing if all of the threads assigned to that queue are busy. At the same time, other threads, that might be servicing other queues, may remain idle waiting for the data from the selected queue to be cleared from the single service queue so that another queue may be selected for processing. This condition violates the fundamental requirement of work conservation. Work conservation is defined as the property of a data processing system that no resources shall be idle while there still is work to be done. In this case, processing cores/threads that could be processing data packets are idle while data packets to be processed remain in the queues.

The different illustrative embodiments recognize and take into account that queue scheduling in a high speed networking environment, such as 10 Gbps, 40 Gbps, or up to 100 Gbps networks, poses a challenge where a high number of queues need to be processed in the limited cycle budget. In addition, the high clock frequency required for the high speed networking environment also limits the number of queues that can be processed in each clock cycle. In a queue scheduler all queues need to be inspected for data to be processed. Electrical propagation delays associated with this inspection put a limit on the number of queues that can be inspected.

The different illustrative embodiments recognize and take into account that conventional methods for dealing with increases in the number of data queues to be serviced by processing threads by using queue inspection sets to reduce the time required to make a scheduling decision cannot be applied effectively to the case where there are constraints on which threads can service which queues. Application of queue inspection sets in the context of such constraints would imply associating a queue inspection set or inspection ring with each thread or other sink. However, this approach becomes infeasible due to the fact that multiple attach/detach operations, one for each thread or other sink that is eligible for a particular queue, at each queue status change would not be able to be accomplished in the time constraints set by the scheduling interval.

The different illustrative embodiments recognize and take into account that it is also desirable to provide a form of load balancing of packet processing over cores in a multiple core system. Load balancing preferably is implemented such that roughly the same number of threads are active on each core. Conventional queue scheduling does not support such load balancing.

Thus, the illustrative embodiments provide a method and apparatus for the integration of various requirements and constraints that are related to directing work from multiple sources to multiple sinks, including potential assignment constraints, into a method or apparatus that is able to arrive at a scheduling decision within an allotted scheduling period and to select the next source for the next available sink while at large maintaining quality of service and work conservation properties and supporting scalability in the number of sources and sinks. As illustrated in FIG. 1, an apparatus or method in accordance with an illustrative embodiment may find application in any data processing environment 100 in which work 102 from multiple sources 104 is to be directed to multiple sinks 106 for processing. In a particular example, an apparatus or method in accordance with an illustrative embodiment is adapted for use in data processing environment 100 such as network processing device 108. Network processing device 108 may be any known type of network processing device, such as a router, network switch, and/or an intelligent network adapter.

In accordance with an illustrative embodiment, sources 104 may include data queues 110. In this case, as well as in other illustrative embodiments, work 102 may include data packets 112, such as data packets 112 on queues 110.

In accordance with an illustrative embodiment, sinks 106 may include a plurality of processor threads 114. For example, multiple threads 114 may be provided on multiple processor cores 116. Each of the plurality of cores 116 may provide one or more threads 114. Sinks 106, in the form of cores 116 and threads 114, may be implemented on one or more integrated circuit chips 117 in the device 108. During any particular scheduling or selection period, one or more sinks 106, such as one or more threads 114, may be available 118. Sink 106 generally is available 118 if sink 106 is not busy processing, and thus is available to receive and process work 102 from source 104.

In accordance with an illustrative embodiment, sources 104 and sinks 106 are subject to one or more assignment constraints 120. Assignment constraints 120 define which sinks 106 may process work 102 from which sources 104. Thus, assignment constraints 120 may also be said to define which sources 104 may provide work 102 to which sinks 106.

In accordance with an illustrative embodiment, assignment constraints 120 may be implemented in qualifier matrix 122. Qualifier matrix 122 implements assignment constraints 120 such that by providing available 118 sinks 106 to qualifier matrix 122, qualifier matrix 122 provides a set of qualified sources 124. Qualified sources 124 are sources 104 associated by assignment constraints 120 with sinks 106 that are available 118 in the current scheduling period. Thus, qualified sources 124 are the set of sources 104 from which work 102 may be assigned to an available 118 sink 106 in the current scheduling period.

In accordance with an illustrative embodiment, qualifier matrix 122 may be implemented by a plurality of qualifier sub-matrixes 123. Each qualifier sub-matrix 123 implements assignment constraints 120 for a subset of supported sources 104. In accordance with an illustrative embodiment, qualifier sub-matrixes 123 are operated simultaneously in parallel, thereby to reduce the time required to determine qualified sources 124.

In accordance with an illustrative embodiment, sink availability information may be provided for sets of sinks 106 implemented on a plurality of chips 117 to multiple qualifier sub-matrixes 123 via multiplexers 125. Multiplexers 125 may be controlled such that sink availability information is provided to qualifier sub-matrixes 123 for a set of sinks 106 on a single chip 117 or such that sink availability information is provided to qualifier sub-matrixes 123 for a set of sinks 106 distributed on a plurality of chips 117.

In accordance with an illustrative embodiment, source scheduler 126 selects a single selected source 128 from qualified sources 124. Thus, source scheduler 126 may be coupled to qualifier matrix 122 to receive qualified sources 124 from qualifier matrix 122. Source scheduler 126 selects selected source 128 from an overlap of qualified sources 124 with sources 104 that have work 102 in the current scheduling period. Selected source 128 is the source 104 from which work 102 may be assigned to an available 118 sink 106 in the current scheduling period. Any appropriate or desired method or structure may be used to implement source scheduler 126 to select selected source 128 from qualified sources 124 that currently have work 102 available.

In accordance with an illustrative embodiment, source scheduler 126 may be provided having a hierarchical structure 130 that can process a high number of sources 104 in parallel each clock cycle by using a modular design with each module processing a subset of sources 104 to be processed. For example, hierarchical scheduler 130 may include a plurality of first level scheduler modules 132. Each first level scheduler module 132 operates preferably simultaneously in parallel with other first level scheduler modules 132 to select an intermediate selected source from a subset of supported sources 104. Preferably the various subsets of sources 104 processed by each first level module 132 do not overlap. The intermediate selected sources from first level modules 132 are provided to second level module 134. Second level module 134 selects selected source 128 from the intermediate selected sources. In accordance with an illustrative embodiment, first level modules 132 and/or second level module 134 may implement their respective selections using a round robin selection process and/or structure. Thus, source scheduler 126 in accordance with the illustrative embodiment solves the problem of processing a large number of sources 104 for scheduling in one clock cycle. As parallelism is achieved with the modular design, hierarchical source scheduler 130 in accordance with the illustrative embodiment is capable of deriving a scheduling decision within the allotted scheduling period to meet high speed networking performance requirements.

In accordance with an illustrative embodiment, sink scheduler 148 selects an available 118 sink 106 that is qualified to receive work 102 from selected source 128. Sink scheduler 148 preferably is coupled to source scheduler 126 to receive selected source 128 and to qualifier matrix 122 to receive available 118 sinks 106 qualified to receive work 102 from selected source 128. Any desired method or structure may be used to select a qualified available 118 sink 106 from multiple qualified and currently available 118 sinks 106 for selected source 128.

In accordance with an illustrative embodiment, where sinks 106 include multiple threads 114 on multiple cores 116, sink scheduler 148 may include core scheduler 150 and thread scheduler 152. Core scheduler 150 selects a core 116 containing an available thread 114 that is qualified to receive work 102 from selected source 128. Core scheduler 150 preferably selects a core 116 based on a workload of the core 116. For example, core scheduler 150 may select from among cores 116 containing available threads 114 that are qualified to receive work 102 from selected source 128 that core 116 having a smallest number or percentage of active threads 114 or a largest number or percentage of available threads 114. Thread scheduler 152 then selects a single qualified available thread 114 on the core 116 selected by core scheduler 150 using any desired method or structure.

In accordance with an illustrative embodiment, packet injector 154 provides work 102 from selected source 128 to the available 118 sink 106 selected by sink scheduler 148.

The illustration of FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 2:
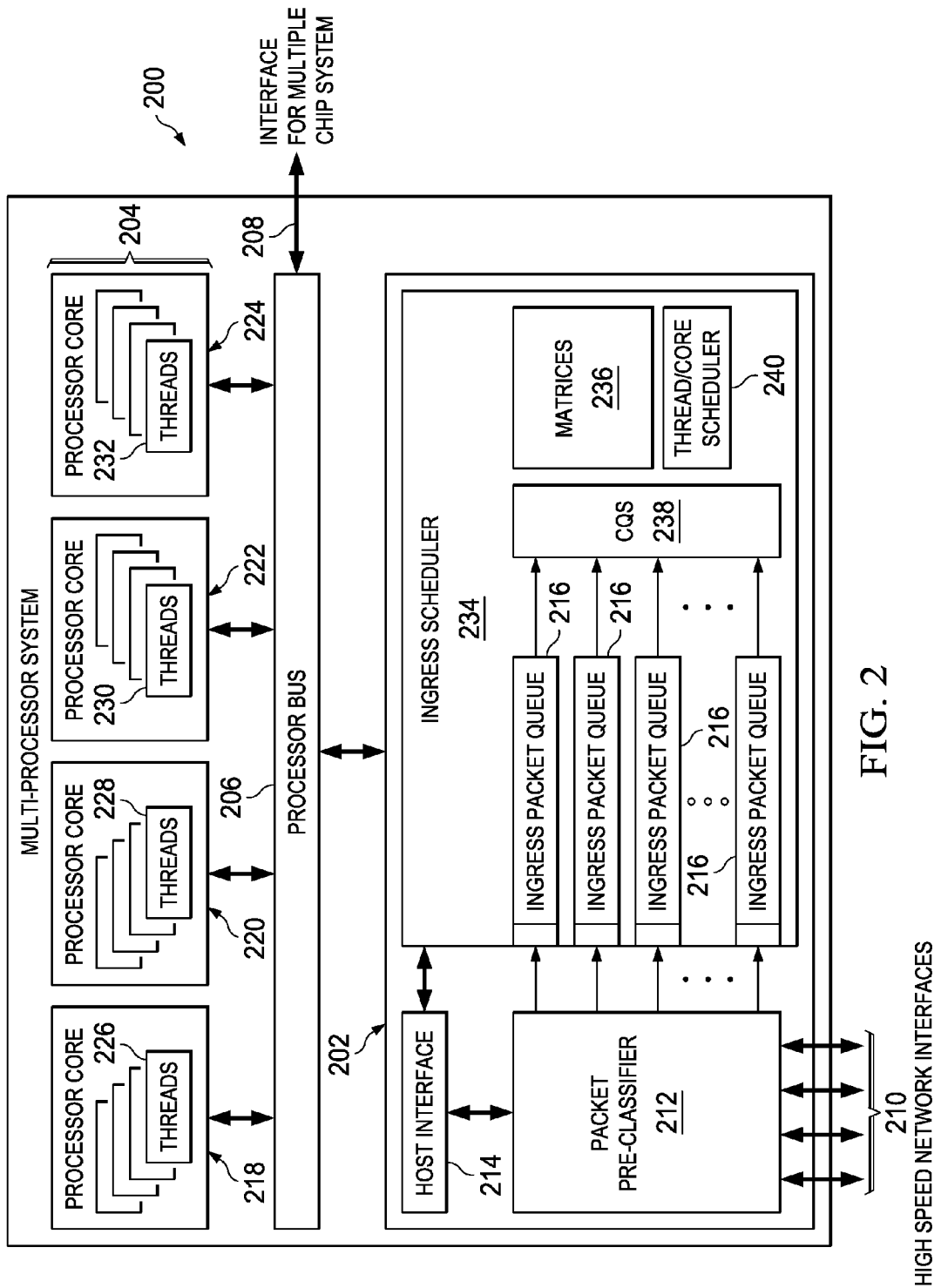
FIG. 2 is a schematic block diagram of a network processing device in which an apparatus and method for assigning work from multiple sources to multiple sinks in accordance with an illustrative embodiment may be implemented.

The block diagram of FIG. 2 shows a network processing device 200 in which an apparatus and method for assigning work from multiple sources to multiple sinks in accordance with an illustrative embodiment may be implemented. In this example, network processing device 200 is an example of one implementation of network processing device 108 of FIG. 1.

Network processing device 200 represents one example of an environment in which an apparatus and/or method in accordance with an illustrative embodiment may be implemented.

Network processing device 200 includes network component 202 and processing component 204. Processor bus 206 connects network component 202 to processing component 204. Processor bus 206 also provides interface 208 to other data processing units, such as to processing units on other chips where network processing device 200 is implemented as a multiple chip system.

Network component 202 sends and receives data packets via high speed network interfaces 210. Received packets are processed initially by packet pre-classifier 212. For example, packet pre-classifier 212 may partition incoming traffic into different segments for the purpose of providing network segment specific quality of service (QoS) or for some other purpose as may be defined by a user via host interface 214. Data packets sorted by packet pre-classifier 212 are directed to ingress packet queues 216. For example, one or more queues 216 may be associated with each segment into which incoming data is divided by packet pre-classifier 212.

Processing component 204 may include a plurality of processor cores 218, 220, 222, and 224. Although in the example illustrated embodiment processing component 204 includes four cores 218, 220, 222, and 224, network processing device 200 in accordance with an illustrative embodiment may include more or fewer cores implemented on one or more processor chips. Each of cores 218, 220, 222, and 224 may support one more processing threads 226, 228, 230, and 232, respectively. In accordance with an illustrative embodiment, each core 218, 220, 222, and 224, preferably may contain any number of threads 226, 228, 230, and 232 as may be required or desired for a particular implementation.

Data packets in queues 216 are sent to threads 226, 228, 230, and 232 for processing via processor bus 206. Queues 216 are examples of sources of work. The data packets in queues 216 are examples of work to be processed. Threads 226, 228, 230, and 232 are examples of sinks for the work. In accordance with an illustrative embodiment, data packets from queues 216 are assigned to threads 226, 228, 230, and 232 for processing by scheduler 234. As will be discussed in more detail below, scheduler 234 in accordance with an illustrative embodiment includes qualifier matrix 236, source scheduler 238, and sink scheduler 240. These components provide an apparatus and method for effectively assigning packets from multiple queues 216 to multiple threads 226, 228, 230, and 232 given assignment constraints on which threads 226, 228, 230, and 232 may process work from which queues 216.

Figure 3:
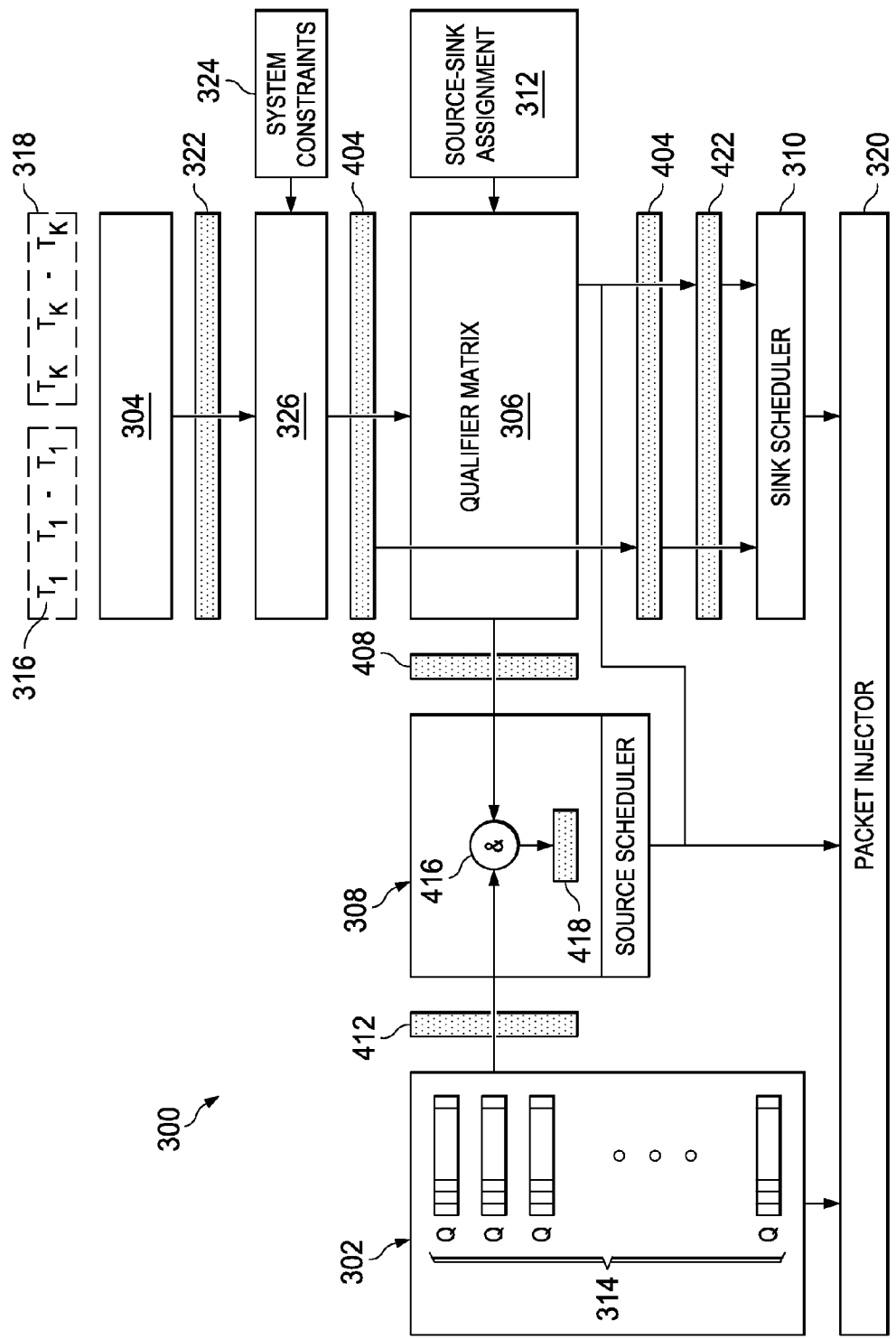
FIG. 3 is a schematic block diagram of an apparatus for assigning work from multiple sources to multiple sinks in accordance with an illustrative embodiment.

The block diagram of FIG. 3 shows a scheduler apparatus 300 for assigning work from multiple sources 302 to multiple sinks 304 in accordance with an illustrative embodiment. Apparatus 300 includes qualifier matrix 306, source scheduler 308, and sink scheduler 310. In this example, qualifier matrix 306 is an example of one implementation of qualifier matrix 122 of FIG. 1 and of qualifier matrix 236 of FIG. 2. Source scheduler 308 is an example of one implementation of source scheduler 126 of FIG. 1 and of source scheduler 238 of FIG. 2. Sink scheduler 310 is an example of sink scheduler 148 of FIG. 1 and of sink scheduler 240 of FIG. 2.

The assignment of work from sources 302 to sinks 304 is subject to a set of assignment constraints 312. Each source 302, for example, a data queue 314, is associated with a set of sinks 304, for example, working threads 316, which are allowed to work on work from that source 302. When a particular sink 304 is not busy it declares itself ready to process new work, such as a new data packet. This logically makes all sources 302 that contain the available sink 304 in their worker set eligible in the next scheduling period to be selected to provide work to sink 304. Qualifier matrix 306 captures this eligibility relationship and hence maps the set of ready or available sinks 304 to a set of qualified sources which is presented to source scheduler 308. Source scheduler 308 selects from the overlap of all qualified and non-empty sources 302 the next source 302 to provide the next work in accordance with an internal source scheduler algorithm. Once a source 302 is selected, sink scheduler 310 determines the most appropriate sink 304 to execute the work based on sink 304 availability status. Where the sink 304 is a thread 316 executing on a core 318, sink scheduler 310 may first determine the most appropriate core 318 to execute the work based on the workload of the core 318. Sink scheduler 310 then selects the next thread 316 on that selected core 318 to receive the work. Finally, the next work from the source 302 selected by the source scheduler 302 is sent to the sink 304 selected by sink scheduler 310 by, for example, packet injector 320. The selected sink 304 is declared busy and the next scheduling cycle commences.

Scheduler 300 supports a finite set of sinks 304. In this example it is assumed that sinks 304 are processing elements of an apparatus comprised of a plurality of cores 318. Each core 318 is comprised of a set of threads 316. Each thread 316 shares underlying core resources with other threads 316 of the same core 318. As a result of the sharing of processor resources, such as pipeline, cache, translation lookaside buffer (TLB), etc., among threads 316 of a single core 318, it is desirable to dispatch work to the core 318 that is least loaded with running threads 316. Threads 316 that are idle consume fewer resources, for example, in the processor pipeline, than threads 316 that are active. So the number of running threads 316 in core 318 is an indication of how busy that core 318 is.

Scheduler 300 also supports a finite set of sources 302. In this case, sources 302 are data queues 314. Associated with each source 302 are assignment constraints defined by source-sink assignment mask 312. Source-sink assignment mask 312 indicates which sinks 304 are in general allowed to handle work from which sources 302. For example, source-sink assignment mask 312 may be implemented such that a bit vector is provided for each supported source 302 with a bit of the bit vector provided for each supported sink 304. A bit of the bit vector may be set if a particular sink 304 is in general allowed to handle work from a particular source 302. In accordance with an illustrative embodiment, the source-sink assignment constraints defined by source-sink assignment mask 312 may be set or changed at any time. In most cases, however, the assignment constraints defined by source-sink assignment mask 312 are defined at a configuration and setup time of scheduler apparatus 300.

The assignment constraints defined by source-sink assignment mask 312 are implemented in qualifier matrix 306. Qualifier matrix 306 is essentially a copy of source-sink assignment mask 312. Qualifier matrix 306 is a two dimensional matrix having a row (or column) for each supported source 302 and a column (or row) for each supported sink 304. Thus, in accordance with an illustrative embodiment, qualifier matrix 306 may be used to determine which sources 302 are qualified to send work to a given sink 304 and which sinks 304 are qualified to receive work from a given source 302.

When a sink 304 is ready for work it announces its "readiness". This may be achieved by providing sink ready mask 322 having a "ready" bit corresponding to each supported sink 304. When a sink 304 is ready for work, the corresponding "ready" bit in the sink ready mask 322 is set. One way of achieving setting such a bit where sink 304 is a thread 316 on a core 318 is through memory-mapped input/output (MMIO) operations. The ready thread 316 may then optionally go to sleep, for example, through memory wait operations, to reduce its footprint on core 318 resources.

Optionally, one or more various system constraints 324 also may affect which sinks 304 are available to perform work in any given scheduling period. For example, system constraints 324 may dictate that certain sinks 304 are declared never to participate in a scheduling decision. System constraints 324 may be implemented in system constraints mask 326.

Qualifier matrix 306 and sink scheduler 310 may be implemented with multiplexers and bit masking to operate in one cycle. Source scheduler 308 may require more complex implementation, as will be described in more detail below.

Figure 4:
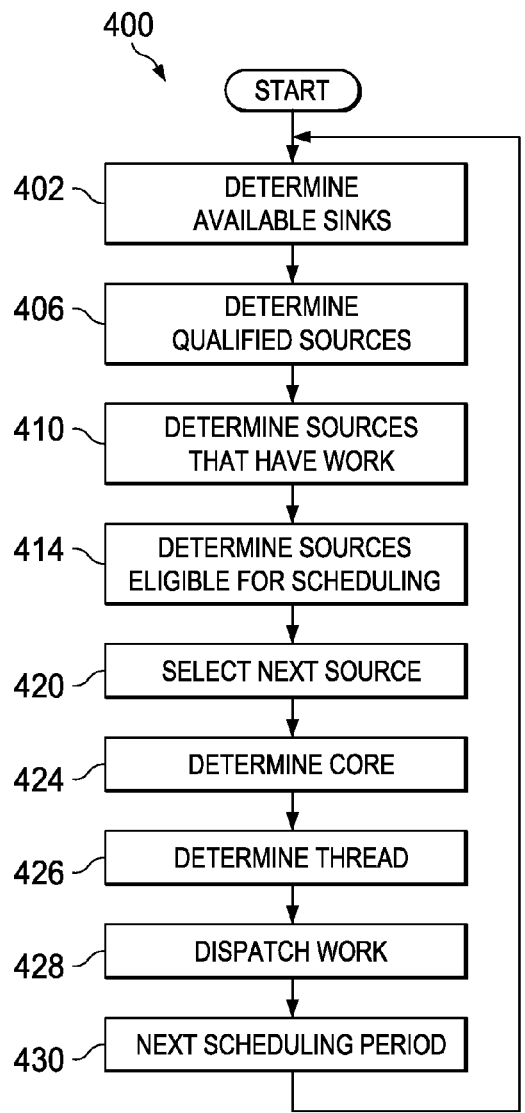
FIG. 4 is a flow chart diagram showing steps of a method for assigning work from multiple sources to multiple sinks in accordance with an illustrative embodiment.

The flow chart diagram of FIG. 4 shows steps of method 400 for making a scheduling decision in accordance with an illustrative embodiment. Method 400 may be implemented using scheduler apparatus 300 of FIG. 3. The following detailed description of method 400 should be considered with reference also to FIG. 3.

All sinks 304 that are available for work in the current scheduling period, that is, all sinks to which work may be dispatched, are determined (step 402). This determination may be made based on sinks 304 that have indicated that they are ready and available for work in sink ready mask 322 and any other system constraints 324 that may affect sink 304 availability as defined by system constraint mask 326. The resulting set of available sinks 304 will be referred to herein as sink pressure 404, as shown in FIG. 3. Sink pressure 404 may be provided in the form of a sink pressure bit vector having a bit corresponding to each supported sink 304, wherein a sink pressure bit for a particular sink 304 is set if that sink 304 is determined to be available for work.

All sources 302 that are qualified to provide work to be processed next are determined (step 406). A particular source 302 is determined to be qualified for being selected during the scheduling period if any of the sinks 304 in general allowed by assignment constraints to handle work from the source 302, as indicated by source-sink assignment mask 312, have been determined to be available for work in the current scheduling period. Step 406 may be implemented in qualifier matrix 306 by performing an AND operation of corresponding bits of source-sink assignment mask 312 and sink pressure 404. The resulting set of qualified sources 302 may be provided in the form of qualified source bit vector 408, as shown in FIG. 3, having a bit corresponding to each supported source 302, and wherein a qualified source bit for a particular supported source 302 is set if the source 302 is determined to be qualified to be selected in the current scheduling period.

All supported sources 302 that have work available to be performed are determined (step 410). Step 410 may be performed simultaneously with previous steps. The resulting set of sources 302 that have work to be performed will be referred to herein as the source pressure 412, as shown in FIG. 3. Source pressure 412 may be provided in the form of a bit vector having a bit corresponding to each supported source 302, wherein a source pressure bit for a particular source 302 is set if the source 302 is determined to have work available to be performed. As a result, a source 302 changing status from or to empty or not-empty requires that only a single bit value be switched.

All sources 302 that are eligible for scheduling in the current scheduling period are determined (step 414). A source 302 is determined to be eligible for scheduling if the source 302 has work to be performed and if a sink 304 that is allowed to perform work for the source 302 is available to perform the work. Step 414 may be performed by source scheduler 308 as AND operation 416, as shown in FIG. 3, of corresponding bits of qualified source bit vector 408 and source pressure bit vector 412. The result of step 414 may be provided in the form of an eligible source bit vector 418, as shown in FIG. 3, having a bit corresponding to each supported source 302, wherein an eligible source bit for a particular supported source 302 is set if the source 302 is determined to be eligible to be selected for scheduling.

The next source 302 for which work is to be performed is selected (step 420). Step 420 may be performed by source scheduler 308 by selecting one source 302 from among those that have been determined to be eligible to be selected as indicated in eligible source bit vector 418. Source scheduler 308 may make this selection based on any scheduling method or algorithm for selecting the most appropriate source 302 from among the eligible sources 302, such as using a round robin selection process. The result of step 420 may be indicated in selected source bit vector 422, as shown in FIG. 3, having a bit for each supported source 302 and wherein one selected source bit corresponding to the selected source 302 is set.

A sink 304 to which work from the selected source 302 is to be assigned is selected. In accordance with an illustrative embodiment, where sinks 304 include multiple threads 316 on multiple cores 318, sink 304 selection preferably includes first determining a core 318 to which the work from the selected source 302 is to be dispatched (step 424). Step 424 may be performed by sink scheduler 310 based on the selected source 302 as indicated in selected source bit vector 422 and thread pressure 404 indicating available threads 316.

Figure 5:
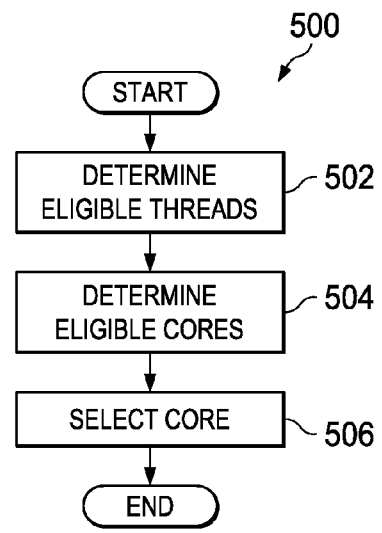
FIG. 5 is a flow chart diagram showing steps of a method for selecting a core to which work from a source is to be dispatched in a method for assigning work from multiple sources to multiple sinks in accordance with an illustrative embodiment.

Steps of a method 500 for implementing step 424 of scheduler method 400 of FIG. 4 to determine a core 318 to which work is to be dispatched are shown in FIG. 5. Eligible threads 316 to which work from the selected source 302 may be directed are determined (step 502). Step 502 may be implemented by an AND operation of corresponding bits of source-sink assignment mask 312, indicating threads 316 allowed to perform work for the selected source 302, and thread pressure 404. Step 502 may be performed using qualifier matrix 306. The result of step 502 may be provided as a thread-scheduable mask in the form of a bit vector having a bit corresponding to each supported thread 316, wherein a thread-scheduable bit for any particular supported thread 316 is set if it is determined that work may be dispatched from the selected source 302 to that thread 316.

The determined eligible threads 316 are used to determine eligible cores 318 (step 504). A core 318 is eligible if any of the eligible threads 316 belong to that core 318. Step 504 may be performed by multiplexing the thread-scheduable mask into a core bit of a core eligibility mask. Core eligibility mask includes a bit vector having a bit corresponding to each of the system cores 318, wherein a core eligible bit corresponding to a particular core 318 is set if the bit for any of its threads 316 is set in the thread-scheduable mask.

One of the eligible cores 318 is selected to receive work from the selected source 302 (step 506). This selection preferably is made based on core workload considerations. For example, an eligible core 318 that has the most idle, or largest proportion of idle, threads 316 may be selected. Alternatively, some other workload based or other criteria may be used to select a core 318 from among determined eligible cores 318.

Returning to FIG. 4, a thread 316 to which work from the selected source 302 is to be dispatched is selected (step 426). Having selected a core 318, one of the available threads 316 on the core 318 that is allowed to perform work for the selected source 320 is selected to receive work from the selected source 302. Step 428 may be performed by sink scheduler 310 by selecting a thread 316 from the selected core 318 for which the thread-schedulable bit in the thread-schedulable mask is set. Any desired criteria and method may be used to select from among selectable threads 316 in step 426, such as using a round robin selection process.

Work is retrieved from the selected source 302 and dispatched to the thread 316 that has been selected as the sink 304 to work on it (step 428). Step 428 may be performed by packet injector 320. Packet injector 320 may, for example, notify the selected thread 316 that it has been selected to receive a work packet. This notification may be provided via a memory touch, if the thread 316 was waiting on a memory location. The selected thread 316 may then be marked as busy. This may be accomplished by clearing the ready bit for this thread in sink ready mask 322. Method 400 then may be restarted and repeated for the next, and subsequent, scheduling periods (step 430).

In an illustrative embodiment, source scheduler 126, 238, and/or 308 may be implemented as a hierarchical scheduler, a multi-priority scheduler, and/or as a scheduler providing improved fairness and work conservation, as disclosed in U.S. Patent Application entitled Assigning Work From Multiple Sources to Multiple Sinks Given Assignment Constraints, filed on even date herewith, and assigned to the assignee of the present application, the details of which are incorporated by reference herein.

Figure 6:
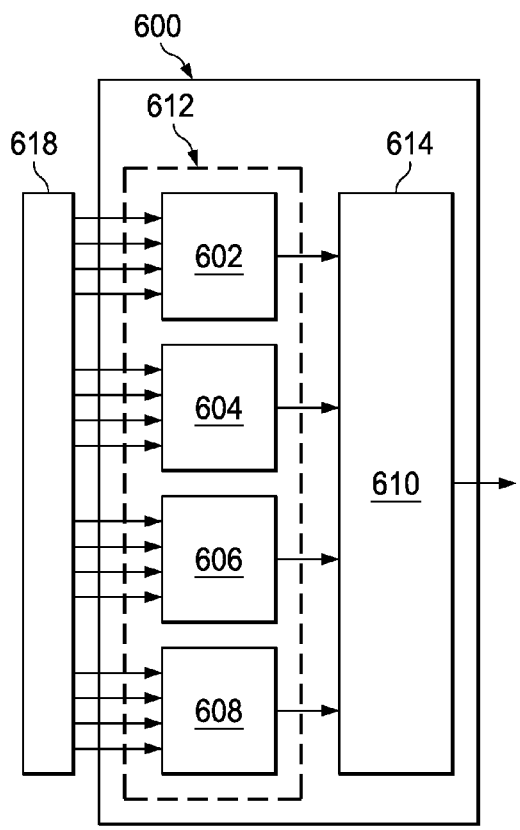
FIG. 6 is a schematic block diagram of a hierarchical scheduler that may be employed in an apparatus and method for assigning work from multiple sources to multiple sinks in accordance with an illustrative embodiment.

In an illustrative embodiment, source scheduler 126, 238, and/or 308 may be implemented using hierarchical scheduler 600 as shown in FIG. 6. In this example, hierarchical scheduler 600 is an example of one implementation of hierarchical scheduler 130 of FIG. 1. Hierarchical source scheduler 600 comprises five scheduling modules 602, 604, 606, 608, and 610. Scheduling modules 602, 604, 606, 608, and 610 are provided in two levels of hierarchy. First level 612 of the hierarchy comprises four scheduler modules 602, 604, 606, and 608. In accordance with an illustrative embodiment, each of the modules 602, 604, 606, and 608 in first level 612 may be implemented as a four-to-one round robin scheduler capable of performing round robin scheduling for four sources in one clock cycle. Second level 614 of the hierarchy comprises scheduler module 610. Module 610 may be implemented as a round robin scheduler that takes the scheduling results from first level 612 of the scheduler hierarchy to select a single selected source. The entire hierarchical scheduler structure 600 is capable of processing 16 queues in a single clock cycle in the example illustrated embodiment. In accordance with an illustrative embodiment, hierarchical scheduler 600 selects a single source from among eligible sources as indicated by eligible source bit vector 618.

The basic hierarchical structure of the illustrated embodiment may be expanded to support more sources by replicating the illustrated hierarchical scheduler structure in a system. Thus, it should be understood that the number of sources to be supported, the number of levels, and the ratio of inputs to outputs in each module at each level may be different in various illustrative embodiments. The particular hierarchical structure to be employed in any particular application may be determined based on a combination of the desired number of sources to be supported, the delay of each component in the hierarchy as implemented, and the time allotted to select a source.

Figure 7:
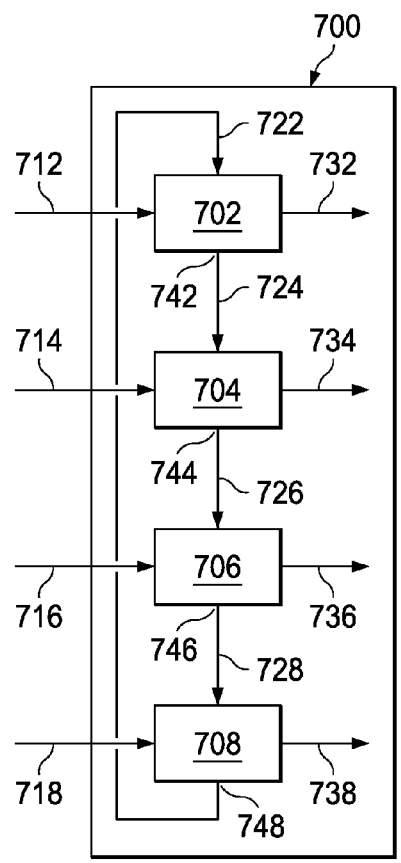
FIG. 7 is a schematic block diagram showing functional components of a scheduler module that may be employed in a hierarchical scheduler in accordance with an illustrative embodiment.

Functional components of a scheduler module 700 that may be employed in a hierarchical scheduler in accordance with an illustrative embodiment are shown in the block diagram of FIG. 7. In this example, scheduler module 700 is an example of one implementation of scheduler modules 602, 604, 606, 608, and 610 in FIG. 6. In accordance with an illustrative embodiment, scheduler module 700 may be implemented by a sequence of base components 702, 704, 706, and 708. One base component 702, 704, 706, or 708 is provided in module 700 for each supported source to be scheduled. Each base component 702, 704, 706, and 708 receives two inputs and produces two outputs. Source eligibility input 712, 714, 716, and 718 denotes whether a source has worked to be processed and that there is a sink available that is allowed to do work for that source. For example, source eligibility input 712, 714, 716, and 718 may be provided by an eligible source bit vector, such as eligible source bit vector 418 of FIG. 3 or eligible source bit vector 618 of FIG. 6. Candidate selection rights inputs 722, 724, 726, and 728 indicate whether a candidate source has a right to be selected first, because the candidate source is next in line to be selected. In the illustrative embodiment being described, inverse logic is used for candidate selection rights 722, 724, 726, and 728. Therefore, in this embodiment, this input indicates a first right for the candidate source to be selected if the input is not set. Candidate selected output 732, 734, 736, and 738 indicates that a source is selected for the current scheduling period. Propagate candidate rights output 742, 744, 746, and 748 propagates candidate selection rights for one source candidate to the next source candidate. If a candidate source for selection had the right to be selected first, but was not able to be selected, then the current candidate source propagates its rights to the next candidate source. Propagate candidate rights output 742 of base component 702 is connected to candidate selection right input 724 of base component 704, propagate candidate rights output 744 of base component 704 is connected to candidate selection right input 726 of base component 706, propagate candidate rights output 746 of base component 706 is connected to candidate selection right input 728 of base component 708, and propagate candidate right output 748 of base component 708 is connected to candidate selection right input 722 of base component 702, thereby establishing a round robin selection structure in accordance with an illustrative embodiment.

Figure 8:
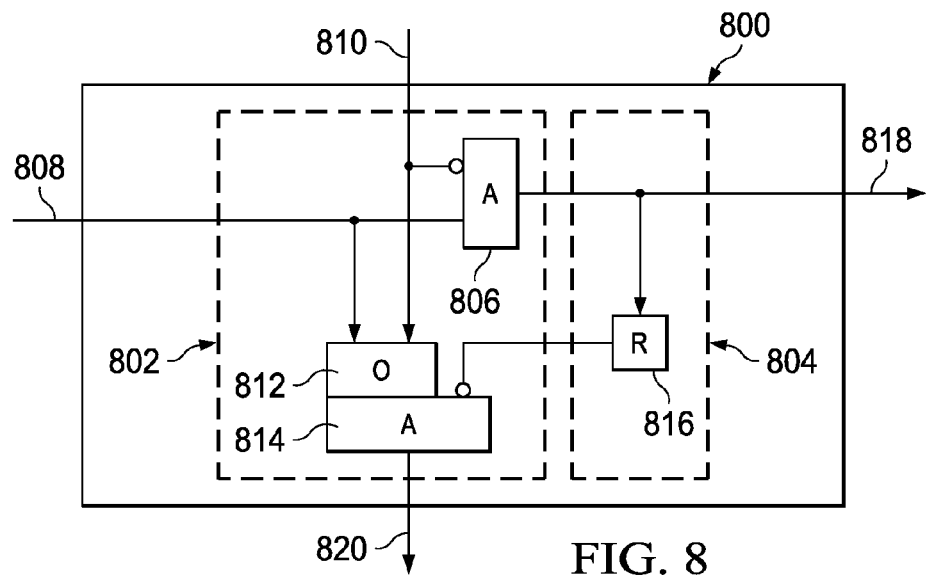
FIG. 8 is a schematic block diagram showing components of a base component that may be employed in a scheduler module in a hierarchical scheduler in accordance with an illustrative embodiment.

Base component 800 for use in a scheduler module in a hierarchical scheduler in accordance with an illustrative embodiment is shown in FIG. 8. In this example, base component 800 is an example of one implementation of base components 702, 704, 706, and 708 in FIG. 7. Base component 800 is provided for each candidate source. Base component 800 includes circuitry 802 for finding a next candidate source and circuitry 804 for implementing a remembrance function. Within circuitry 802 for finding a next candidate, AND gate 806 allows selection of the candidate source if it is eligible, indicated by a 1 on source eligible input 808, and qualified to be selected by virtue of having candidate selection rights, indicated by a 0 on candidate selection right input 810. OR gate 812 propagates the previous candidate status to prevent the next candidates to be selected. AND gate 814 blocks this propagation to start the daisy chain at the current candidate selection.

Due to AND gate 806, a source can only be considered for selection during a scheduling period if the candidate selection right input 810 to the inverted input of AND gate 806 is 0, that is, if the source has the candidate selection right. If it has the candidate selection right, and the source is eligible, such that source eligible input 808 to non-inverted input of AND gate 806 is 1, then the output of AND gate 806 will be 1 and the source will be selected. This selection will be remembered in remembrance latch 816 and provided on candidate selected output 818. Remembrance latch 816 will not have been set at the point that the selection is saved. The combination of source eligible 808 and candidate selection right 810 inputs to OR gate 812 is provided as input to AND gate 814. The inverted value of the selection remembered in remembrance latch 816 is provided as the other input to AND gate 814. Thus, if the source is selected, the propagate rights value output 820 of AND gate is 1. This value, indicating that no candidate selection rights are propagated, is propagated to base component circuit 800 for the next candidate source. Accordingly, due to AND gate 806 in the base component circuit 800 for the next source, the next source cannot be selected. However, if the current source is not eligible, so that the non-inverted input to AND gate 806 is 0, then the source will not be selected, remembrance latch 816 will not be set and will remain at 0, inverted input to AND gate 814 will be 1, and any candidate selection right input 810 received at the input to OR gate 812 will be propagated to the base component circuit 800 for the next candidate source. Thus, it can be seen that only at most one candidate component in a scheduler module can have remembrance latch 816 set at the beginning and end of each scheduling period.

Due to the propagation rights, either a candidate source has been selected, at which point, due to the circuitry wrap, all candidate selection right values will be set to "1", or no candidate source has been selected, due to no source being eligible, at which point all candidate selection right values will be set to "0". Remembrance latch 816 of the candidate source that is selected in the previous scheduling cycle is the only one that can insert a first propagation right to its successor in the next scheduling period, due to the output of remembrance latch 816 to the inverting input of AND gate 814.

The switching delays of the circuitry of a round robin scheduler define the maximum number of source candidates that can be examined in a scheduling period. Let dt be the delay of each component and let SST be the time allotted for determining a selected source once it is determined that the source is eligible. Note that SST will be smaller than the overall scheduling period. Accordingly, a maximum number of sources that can be supported by a round robin scheduler is defined as SST/dt. Given that dt is defined by the underlying circuit technology, in order to increase the number of supported sources, one would have to increase SST, which then reduces the total frequency at which scheduling decisions can be derived. Accordingly this would decrease the total throughput of the scheduler.

To increase the supported number of sources without increasing the time allotted to select a source candidate, the hierarchical structure described above is employed. In this structure the basic round robin scheduling block is replicated multiple times, each serving a different subset of the sources. The number of sources handled, the ratio of inputs to outputs of each module, and the number of levels employed may be determined based on the total desired number of sources to be handled, the delay dt of each component, and the desired time allotted for selecting a source SST.

In the illustrative embodiment being described, there are four independent yet identical scheduler modules in the first level. Each of these first level scheduler modules maintains its independent remembrance point. Otherwise, the first level scheduler modules are not connected to each other. Each scheduler module serves a non-overlapping subset of sources, and all sources are served by at least one first level scheduler. During a first phase, all first level schedulers determine in parallel their selected candidate. Once completed, the second level scheduler performs the same round robin scheduling decision on its inputs. An input at the second level is eligible if the first level scheduler connected to it has selected a candidate for its associated subset of the sources. Once the second level selects which first level scheduler output is selected, the first level scheduler is notified so the remembrance latch can be set for the scheduler selected. Those first level schedulers that were not selected will not set their remembrance latch.

Note that the hierarchical scheduler provides the same fairness as a single layer scheduler. However, in the example provided, with 16 sources to service, the time to derive a scheduling decision is 2*4*dt=8*dt. This compares with 16*dt in the single layer case. Due to an additional scheduler component that is required, second layer scheduler module, the illustrative hierarchical scheduler comes at an approximately 25% circuitry area increase over the comparable single layer scheduler.

As discussed above, in accordance with an illustrative embodiment, the size of a qualifier matrix is determined by the number of supported sources and sinks. For a basic flat implementation of the qualifier matrix, the size of the qualifier matrix is related to the number of supported sources times the number of supported sinks. For a high number of sources and a high number of sinks, for example 64 source queues and 256 sink threads, the time required to select the source may be too long if a flat qualifier matrix implementation is employed. This is because circuitry cannot drive filtering of the sinks on the qualifier mask due to signal delays associated with the number of sources of the qualifier matrix.

In accordance with an illustrative embodiment, a qualifier matrix implementing assignment constraints used for assigning work from multiple sources to multiple sinks is implemented in a multiple matrix structure that provides parallelism to increase the speed with which qualified sources may be determined. This is accomplished by implementing source-sink assignment constraints in multiple sub-matrixes that can be processed in parallel, rather than as a single large matrix.

For example, consider an illustrative embodiment of an apparatus and/or method for assigning work from multiple sources to multiple sinks that supports 64 sources and 256 sinks. In accordance with an illustrative embodiment, instead of employing a flat 64×256 qualifier matrix to support the 64 sources and 256 sinks, four 16×64 sub-matrixes, with each of the sub-matrixes supporting 16 sources and 64 sinks, may be employed. Each of these four sub-matrixes operates in parallel to drive filtering of 64 sinks on the qualifier mask and feeds 16 source qualifier signals to a source scheduler as described above. Such parallel operation allows all 256 sinks to be filtered in a reduced time period, to allow the source scheduler to make a scheduling decision in the allotted scheduling period to meet performance requirements. The qualified source signals produced by each of the qualifier sub-matrixes operating in parallel may be provided to corresponding first level scheduler modules of a hierarchical scheduler that also operate in parallel, as described above. The scheduling results presented by the first level schedulers in parallel are then further scheduled by a centralized second level scheduler to select one source from which work is to be dispatched to a qualified sink. With this mechanism, in accordance with an illustrative embodiment, multiple schedulers and qualifier matrixes running in parallel are able to dispatch work from a selected source to a selected sink in each scheduling period, even where very large numbers of sources and sinks are to be supported.

Figure 9:
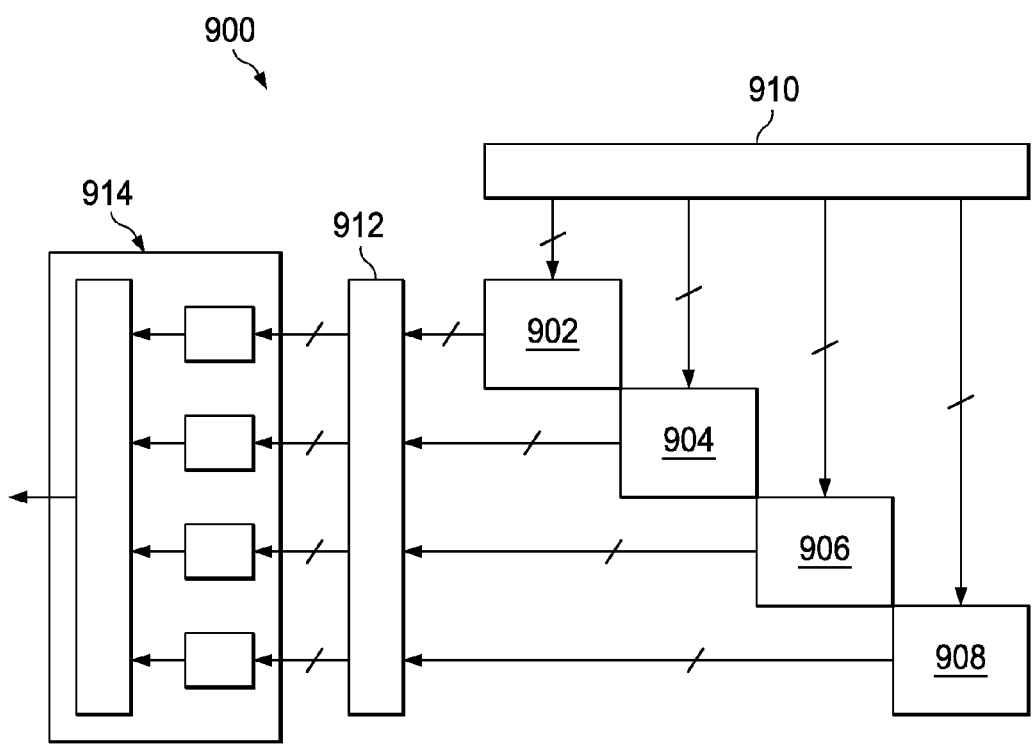
FIG. 9 is a schematic block diagram of an assignment constraint matrix implemented as multiple parallel qualifier matrixes in accordance with an illustrative embodiment.

A parallel qualifier matrix structure 900 in accordance with an illustrative embodiment is illustrated in FIG. 9. In this example, qualifier matrix structure 900 comprises four qualifier sub-matrixes 902, 904, 906, and 908, operating in parallel. In different embodiments, more or fewer than four qualifier sub-matrixes of the type being described may be employed. Each qualifier sub-matrix 902, 904, 906, and 908 implements the assignment constraints between a subset of all of the supported sources and a subset of all of the supported sinks. For example, where a total of M sources and N sinks are supported, each qualifier sub-matrix 902, 904, 906, and 908 may implement the assignment constraints for non-overlapping subsets of M/X sources and N/X sinks, where X is an integer greater than one. In the example being discussed, M=64, N=256, and X=4. Therefore, in this example, each qualifier sub-matrix 902, 904, 906, and 908 is a 16 by 64 matrix implementing assignment constraints for non-overlapping subsets of 16 sources and 64 sinks.

In accordance with an illustrative embodiment, each qualifier sub-matrix 902, 904, 906, and 908 receives as input a non-overlapping subset of the bits from sink pressure bit vector 910. As discussed above, sink pressure bit vector 910 may contain a bit corresponding to each supported sink, wherein the sink pressure bit for a particular sink is set if that sink is determined to be available for work. In the example being discussed, where 264 sinks are supported, each qualifier sub-matrix 902, 904, 906, and 908 receives as input a non-overlapping subset of 64 sink pressure bits from sink pressure bit vector 910.

Qualifier sub-matrixes 902, 904, 906, and 908 implement source-sink assignment constraints for non-overlapping subsets of the supported sources for the subsets of the supported sinks represented by the sink pressure bits provided to each qualifier sub-matrix 902, 904, 906, and 908. In accordance with an illustrative embodiment, therefore, qualifier sub-matrixes 902, 904, 906, and 908 operate in parallel to provide non-overlapping subsets of the bits for qualified source bit vector 912. As discussed above, qualified source bit vector 912 may contain a bit corresponding to each supported source, wherein a qualified source bit for a particular supported source is set if the source is determined to have a sink that is qualified to do work for the source and which is available to do work, thereby indicating that the source is qualified to be selected in the current scheduling period. Thus, a set bit in qualified source bit vector 912 is an example of a source qualified signal for a determined qualified source. In the example being discussed, where 64 sources are supported, each qualifier sub-matrix 902, 904, 906, and 908 provides a non-overlapping subset of 16 qualified source bits for qualified source bit vector 912.

In accordance with an illustrative embodiment, each qualifier sub-matrix 902, 904, 906, and 908 may be coupled to source scheduler 914 to provide qualified source information, in the form of source qualified signals, via qualified source bit vector 912, to source scheduler 914 which selects a single source to which work is to be dispatched. In accordance with an illustrative embodiment, source scheduler 914 may be a hierarchical scheduler as described above. The hierarchical source scheduler 914 may process the qualified source information provided by each qualifier sub-matrix 902, 904, 906, and 908 in parallel, in the manner described above.

In accordance with an illustrative embodiment, implementation of source-sink assignment constraints in multiple qualifier sub-matrixes may support techniques for dynamically assigning processing tasks from multiple sources to multiple sinks based on different modes to accommodate different chip configurations. With multiple chips, in order to have any source feeding any chip able to be handled by any sink core/thread in any chip, a single scheduler function has to be implemented. However, for easy chip scalability, this single scheduler has to be implemented in a decentralized way in each of the chips. The capability to have work from any supported source handled by any sink chip/core/thread leads to a too large silicon area on the chip. In order to have a practical implementation some different scheduling modes should be found.

In accordance with an illustrative embodiment, work from a supported number of sources may be dispatched to sinks on a single chip or distributed among sinks on multiple chips using a multiple qualifier sub-matrix structure as described above. In accordance with an illustrative embodiment, multiple qualifier sub-matrixes are used in combination with a hierarchical scheduler as described above. For example, in accordance with an illustrative embodiment, work from 64 supported source queues may be dispatched to sink threads on a single chip, 64 sources to one chip, or distributed among all sink threads on four chips, 16 sources per chip. This reduces the total area required and also addresses the scalability issues resulting from using a flat matrix implementation.

Figure 10:
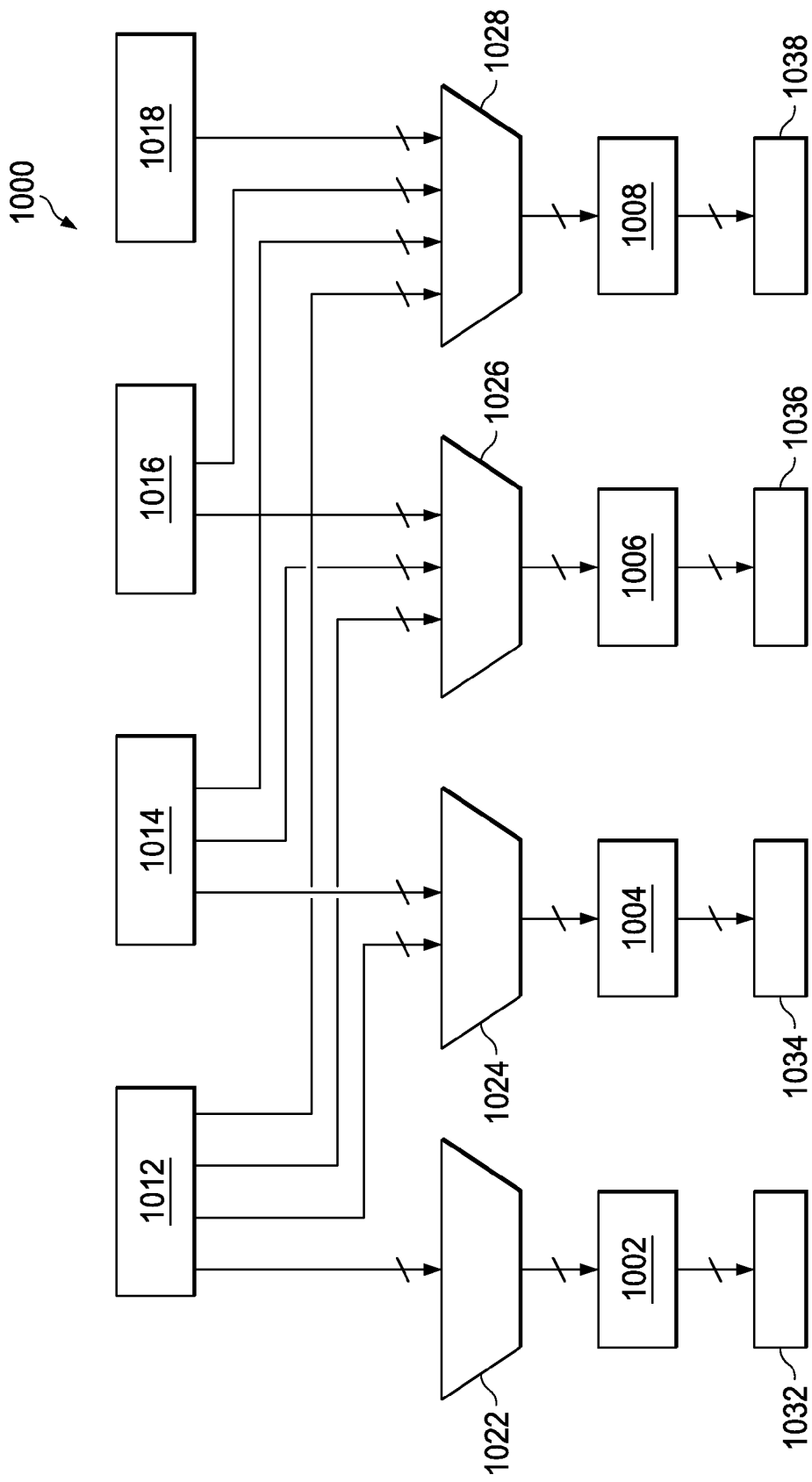
FIG. 10 is a schematic block diagram of an assignment constraint matrix implementation for use in assigning processing tasks from multiple sources to multiple sinks in accordance with an illustrative embodiment based on different modes to accommodate different chip configurations.

A block diagram of qualifier matrix structure 1000 for use in assigning processing tasks from multiple sources to multiple sinks in accordance with an illustrative embodiment based on different modes to accommodate different chip configurations is illustrated in FIG. 10. In this example, source-sink assignment constraints are implemented in four qualifier matrixes 1002, 1004, 1006, and 1008 operating in parallel. In other illustrative embodiments more or fewer than four qualifier matrixes of the type described may be employed. Qualifier matrixes 1002, 1004, 1006, and 1008 support non-overlapping subsets of all supported sources. For example, where there are 64 supported sources, each qualifier matrix 1002, 1004, 1006, and 1008 may support a non overlapping subset of 16 sources. Each qualifier matrix 1002, 1004, 1006, and 1008 may receive sink availability information, such as sink pressure bits, for sinks on multiple chips 1012, 1014, 1016, and 1018. For example, multiplexers 1022, 1024, 1026, and 1028 may be provided to allow for the selection of sink pressure for sinks on which chips 1012, 1014, 1016, and 1018 will be provided to which qualifier matrixes 1002, 1004, 1006, and 1008 to implement different modes of operation. Each qualifier matrix 1002, 1004, 1006, and 1008 may produce qualified source information 1032, 1034, 1036, and 1038, respectively, indicating sources determined to be qualified to be selected in the current scheduling period, based on the assignment constraints implemented in qualifier matrixes 1002, 1004, 1006, and 1008 and the sink availability information provided for sinks on one or more chips 1012, 1014, 1016, and 1018. Qualified source information 1032, 1034, 1036, and 1038 may be provided to a scheduler, such as a hierarchical scheduler as described above, for the selection of a single qualified source to which work is to be dispatched.

In accordance with an illustrative embodiment, qualifier matrix structure 1000 may be operated to implement different modes to accommodate different chip configurations. For example, in a first mode of operation, multiplexers 1022, 1024, 1026, and 1028 are controlled to provide sink availability information for sinks on chip 1012 to all qualifier matrixes 1002, 1004, 1006, and 1008. In this mode, qualifier matrix structure 1000 is configured in such a way that all matrixes 1002, 1004, 1006, and 1008 process qualified sink information for the sinks on one chip 1012. In another mode, multiplexers 1022, 1024, 1026, and 1028 are controlled such that qualifier matrixes 1002, 1004, 1006, and 1008 receive sink availability information for sinks on chips 1012, 1014, 1016, and 1018, respectively. Qualifier matrix structure 1000, and other qualifier matrix structures in accordance with an illustrative embodiment, maybe configured to implement different modes of operation from those described by example herein to accommodate different chip configurations. The multiple qualifier matrix structure allows the support of multiple sources and multiple sinks from multiple chips without using a flat matrix structure. The non-flat multiple qualifier matrix structure may be expanded in accordance with an illustrative embodiment to support more sources and sinks with linear increases in area. A flat matrix implementation would require an exponential increase in area.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and\or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and explanation, but is not intended to be exhaustive or to limit the invention to the form disclosed. Many modifications and variations will be apparent to those of ordinary skill in the art without departing from the scope and spirit of the invention. The illustrative embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
one or more processors;
a plurality of qualifier matrixes, wherein each of the plurality of qualifier matrixes is configured to determine qualified sources in a subset of supported sources that are associated by assignment constraints to a set of sinks by determining that a source is a qualified source when at least one sink in the set of sinks is available and is qualified to receive work from the source, and wherein the plurality of qualifier matrixes are configured to operate in parallel, and wherein each of the plurality of qualifier matrixes provides a source qualified signal for each determined qualified source; and
a hierarchical source scheduler coupled to the plurality of qualifier matrixes and configured to receive the source qualified signal from each of the plurality of qualifier matrixes and to select a single selected source from among all determined qualified sources, wherein the hierarchical source scheduler comprises:
a plurality of first level source scheduler modules, each configured to select simultaneously an intermediate selected source from a subset of a plurality of sources; and
a second level source scheduler module coupled to the plurality of first level source scheduler modules and configured to receive intermediate selected sources from the first level source scheduler modules and to select the single selected source from the intermediate selected sources.

2. The apparatus of claim 1, wherein the subsets of supported sources for each of the plurality of qualifier matrixes are not overlapping.

3. The apparatus of claim 1, wherein the set of sinks for each of the plurality of qualifier matrixes is a non-overlapping subset of a set of supported sinks.

4. The apparatus of claim 1, wherein the source qualified signal from each of the plurality of qualifier matrixes is provided to corresponding different ones of the plurality of first level scheduler modules.

5. The apparatus of claim 1, wherein:
the supported sources are data queues; and
the sinks are processor threads.

6. A method for determining sources qualified to provide work to a set of sinks, comprising:
providing sink availability information for the set of sinks to a plurality of qualifier matrixes;
determining, from the sink availability information in parallel in each of the plurality of the qualifier matrixes, qualified sources in a subset of supported sources that are qualified to provide the work to the set of sinks by determining that a source is a qualified source when at least one sink in the set of sinks is available and is qualified to receive the work from the source, and wherein each of the plurality of qualifier matrixes provides a source qualified signal for each determined qualified source; and
receiving the source qualified signal from each of the plurality of qualifier matrixes and selecting a single selected source from among all determined qualified sources using a hierarchical source scheduler, wherein the hierarchical source scheduler includes:
a plurality of first level source scheduler modules, each configured to select simultaneously an intermediate selected source from a subset of a plurality of sources; and
a second level source scheduler module coupled to the plurality of first level source scheduler modules and configured to receive intermediate selected sources from the first level source scheduler modules and to select the single selected source from the intermediate selected sources.

7. The method of claim 6, wherein the subsets of supported sources for each of the plurality of qualifier matrixes are not overlapping.

8. The method of claim 6, wherein the sink availability information provided to each of the plurality of qualifier matrixes is sink availability information for a non-overlapping subset of a set of supported sinks.

9. The method of claim 6, further comprising selecting the sink availability information to be provided from sink availability information for a set of sinks on a single chip or sink availability information for a set of sinks on a plurality of different chips.

10. The method of claim 6, wherein:
the supported sources are data queues; and
the sinks are processor threads.

11. An apparatus comprising:
one or more processors;
a plurality of qualifier matrixes, wherein each of the plurality of qualifier matrixes is configured to determine sources in a subset of supported sources that are qualified to provide work to a set of sinks from sink availability information, and wherein the plurality of qualifier matrixes are adapted to operate in parallel; and
a plurality of multiplexers, wherein each of the plurality of multiplexers is configured to receive the sink availability information for sinks on one or more chips and is configured to be controlled such that the sink availability information is provided to the plurality of qualifier matrixes for the set of sinks on a single chip or such that the sink availability information is provided to the plurality of qualifier matrixes for the set of sinks distributed on a plurality of chips.

12. The apparatus of claim 11, wherein
each of the plurality of qualifier matrixes provides a source qualified signal for each source that is determined to be qualified to provide the work to the set of sinks; and, further comprising:
a source scheduler coupled to the plurality of qualifier matrixes and configured to receive the source qualified signal from each of the plurality of qualifier matrixes and to select a single selected source from among all sources determined to be qualified to provide the work to the set of sinks.

13. The apparatus of claim 12, wherein the source scheduler is a hierarchical source scheduler comprising:
a plurality of first level source scheduler modules, each configured to select simultaneously an intermediate selected source from a subset of a plurality of sources; and
a second level source scheduler module coupled to the plurality of first level source scheduler modules and configured to receive intermediate selected sources from the first level source scheduler modules and to select the selected source from the intermediate selected sources; and wherein
the source qualified signal from each of the plurality of qualifier matrixes is provided to corresponding different ones of the plurality of first level source scheduler modules.

14. The apparatus of claim 11, wherein:
the supported sources are data queues; and
the sinks are processor threads.

* * * * *